United States Patent Office 3,376,281
Patented Apr. 2, 1968

---

3,376,281
CHLORINATED HYDROXYL-CONTAINING COMPOSITIONS AND URETHANE POLYMERS PREPARED THEREFROM
Eugene F. Cox, Charleston, and Robert J. Knopf, St. Albans, W. Va., assignors to Union Carbide Corporation, a corporation of New York
No Drawing. Filed Sept. 13, 1965, Ser. No. 487,064
7 Claims. (Cl. 260—209)

The invention relates to certain chlorine- and hydroxyl-containing compositions and to urethane polymers that can be derived therefrom. In a particular aspect, the invention relates to certain hydroxyl-containing compositions that are derived from hexachlorobenzene, and to urethane polymers that are prepared by reacting said compositions with organic polyisocyanates.

Urethane polymers have gained wide commercial acceptance in such widely divergent applications as the production of cushions, padding, paints and varnishes, gaskets and other sealers, heat and sound insulation, filters, and the like. In many applications, it is desirable that the urethane polymer be flame resistant. Flame resistance can be imparted to a urethane polymer by many methods, one of which is to include halogen-containing compositions in the polymer-forming reaction mixture. Among the halogen-containing compositions that have been proposed for use in urethane polymers are the reaction products of decachlorobiphenyl and certain polyols of low molecular weight. However, said reaction products have very high melting points which make it impractical to use them as urethane polymer intermediates on a commercial scale. The high melting points of said reaction products is illustrated by the disclosure in French Patent No. 1,357,100 that the reaction product of 3 moles of decachlorobiphenyl and 6 moles of trimethylolpropane has a melting point of about 100° C. The base-catalyzed addition of, for instance, alkylene oxide or lactone to said reaction products (it would be desired to do this in the hope of lowering the melting point) would be very difficult to achieve because of the destruction of the base catalyst through alkali metal halide formation. Therefore, as a practical matter, the use of the disclosed reaction products of polyols and decachlorobiphenyl in the commercial production of urethane polymers is virtually precluded.

The present invention provides hydroxyl-containing compositions that are derived from hexa-chlorobenzene. The hydroxyl-containing compositions of the invention are derived from hexachlorobenzene and either certain polyols or certain amines.

In a first major aspect, the invention provides hydroxyl-containing compositions that are derived from hexachlorobenzene and certain polyols. The polyols that are employed in the said first major aspect of the invention include the alkylene oxide adducts of polyhydric alcohols containing at least three alcoholic hydroxyl groups. Specific illustrative examples of such polyhydric alcohols include glycerol, 1,2,6-hexanetriol, 1,1,1-trimethylolethane, 1,1,1 - trimethylolpropane, pentaerythritol, sorbitol, trihydroxycyclohexane, and other alkanepolyols, sucrose, alpha-methylglucoside, glycol glucosides, and other non-reducing sugars and sugar derivatives, pyrogallol and other trihydroxybenzenes, trialkanolamines such as triethanolamine, triisopropanolamine, and the like. The alkylene oxide adducts are produced according to known procedures by reacting ethylene oxide, propylene oxide, butylene oxide, or mixtures thereof with one or more of the above-exemplified polyhydric alcohols. Preferably at least one, and more preferably at least two, moles of alkylene oxide is employed per mole of polyhydric alcohol. The alkylene oxide adducts thus produced for use in the invention will have hydroxyl numbers of at least about 40 and preferably at least about 100, up to about 600 or more.

The hydroxyl-containing compositions that are provided by the first major aspect of the invention are produced by reacting one or more of the above-described polyols with hexachlorobenzene in the presence of a base. The reaction between the polyol and hexachlorobenzene generates hydrochloric acid which is neutralized by the base. The base can be an alkali metal hydroxide such as sodium hydroxide or potassium hydroxide. Alternatively, the polyol can be initially reacted with alkali metal such as sodium or potassium to produce an alkali metal alkoxide which is then reacted with the hexachlorobenzene.

The reaction that occurs between the polyol and hexachlorobenzene can be illustrated by the equation:

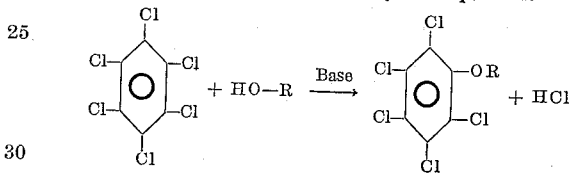

For each chloride that is replaced on the benzene nucleus, one molecule of hydrochloric acid is liberated. The degree of replacement of chloride by the alcohol residue (i.e., —OR), is determined to a large extent by the amount of base that is present. That is, the base is preferably employed in the exact amount needed to neutralize the hydrochloric acid liberated by the substitution reaction.

The hydroxyl-containing compositions that are provided by the first major aspect of the invention includes compositions that can be represented by Formula I:

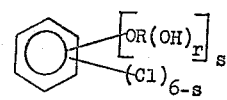

wherein R represents the residue after removal of the hydroxyl groups of an alkylene oxide adduct of a polyhydric alcohol having $r+1$ hydroxyl groups, wherein $r$ represents a number having a value of from 2 to 7, and wherein $s$ represents a number having an average value of from 1 to 2.

The proportion of the reactants employed to produce the compositions that are within the scope of Formula I can vary widely. In general, there can be employed from about 0.4, and lower, to about 3, and higher, moles of hexachlorobenzene per mole of polyol. It may at times be preferred to employ a small stoichiometric excess of polyol (e.g., about 10% excess over stoichiometric) in order to avoid the production of a major proportion of compositions wherein a single polyol residue is bonded to two or more perchlorobenzene nuclei. (Such compositions are, of course, within the scope of the invention and at times a minor proportion of such polysubstituted polyols is desirable in order to lower the viscosity of the hydroxyl-containing compositions of the invention. The loss of hydroxyl functionality is not serious because the starting polyols are of high functionality.) The base catalyst is preferably employed in the exact amount needed to neutralize the hydrochloric acid liberated by the substitution reaction. To illustrate the stoichiometry involved, if it were desired to produce a composition of the formula:

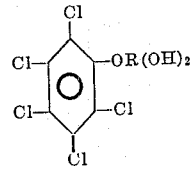

a desirable reaction mixture would contain 1 equivalent of base and about 1 mole of hexachlorobenzene per mole of triol. If it were desired to produce a composition having an average molecular structure of the formula:

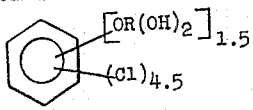

a desirable reaction mixture would contain about 1.5 moles of triol and 1.5 equivalents of base per mole of hexachlorobenzene.

The reation conditions will vary somewhat depending upon the nature and proportion of reactants. Generally, the reaction can be carried out at temperatures of from about 125° C. to about 150° C. for from about 1 to 10 hours. An inert diluent can be employed, if desired, but is not required.

The product can be recovered by standard procedures. For instance, filtration will remove most of the neutralized chloride salt and any unreacted hexachlorobenzene. The filtered product can then be diluted with, e.g., isopropyl alcholol and passed through ion exchange resins to remove small amounts of ionic impurities. Distillation of the solvent leaves the hydroxyl-containing composition as a residue product.

In a second major aspect, the invention provides hydroxyl-containing compositions that are derived from amines and hexachlorobenzene. These compositions can be represented by Formula II:

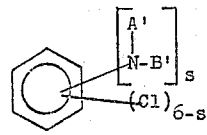

I wherein $s$ represents a number having an average value of from about 1 to 2, wherein A' represents hydrogen, or

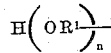

wherein $n$ is a number having a value of at least 1 and is preferably not more than about 5 and wherein $R_1$ represents alkylene of from 2 to 4 carbon atoms; and wherein B' represents (a)

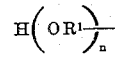

wherein $R^1$ and $n$ are as identified above, (b) omega-hydroxyalkylcarbonyl, (c)

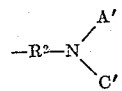

wherein $R^2$ represents a divalent group such as alkylene, bis(alkyleneoxycarbonyl)alkylene, alkyleneoxyalkylene, bis(alkyleneoxycarbonyl)alkenylene, cycloalkylene, bis(alkyleneoxy)carbonyl, alkylenearylenealkylene, alkylenecycloalkylenealkylene, bis(cycloalkylene)alkylene, bis (alkyleneoxy)alkylene, and the like, wherein preferably the $R^2$ group will have not more than about 20 carbon atoms, wherein A' is as identified above, and wherein C' represents omega-hydroxyalkylcarbonyl or

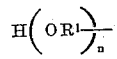

wherein $R^1$ and $n$ are as identified above, or (d)

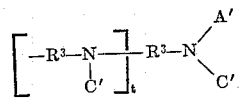

wherein $R^3$ represents alkylene of from 2 to 6 carbon atoms, wherein $t$ represents a number having a value of from 1 to about 3, and wherein A' and C' are as identified above.

The compositions that are within the scope of Formula II can be produced by several procedures. One desirable method is to react hexachlorobenzene with an amine to form an amino-substituted perchlorobenzene, and then to add alkylene oxide or lactone to this composition until the reactive amino hydrogens have been replaced by hydroxyalkyl or omega-hydroxyalkylcarbonyl groups. A second method is to initially react the amine with alkylene oxide or with lactone, leaving at least 1 basic amino hydrogen on the amine, and to then react the substituted amine with hexachlorobenzene. The former of the said two methods is preferred.

The amines that can be employed to produce the compositions that are within the scope of Formula II include ammonia, mono- and diethanolamine, mono- and diisopropanolamine, ethylenediamine, propylenediamine, diethylenetriamine, triethylene-tetramine, 1,3 - butainediamine and other butylenediamines, 1,6 - hexanediamine, para-xylylenediamine, meta-xylylenediamine, cyclohexane - 1,4 - bis(methylamine), 1,3 - cyclohexanediamine, 1 - methyl - 2,4 - cyclohexanediamine, bis(4-aminocyclohexyl)methane, bis ( 3 - aminopropyl) ether, bis(3-aminopropyl)amine, bis( 3 - aminopropoxy)ethane, and the like. The alkylenediamines and the polyalkylenepolyamines are preferred.

The reaction of amine with hexachlorobenzene occurs with liberation of hydrochloric acid, as is illustrated by the equation:

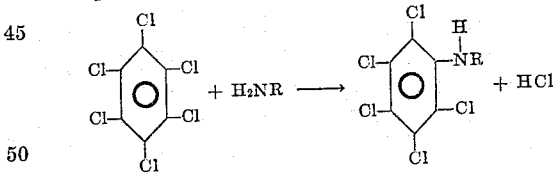

The hydrochloride acid will be taken up by the amino groups present in the reaction mixture, and it can be neutralized by the addition of, for instance, alkali metal hydroxide.

The reaction conditions are much the same as those described above for the compositions defined by Formula I, with the exception that the preferred reaction temperature is a little lower (i.e., about 100° C. to 125° C.). The product can be recovered by procedures analogous to those described above, such as by filtering out the neutralized chloride salt and any unreacted hexachlorobenzene, ion exchanging, and distillation. The compositions of the invention can be produced in conventional reaction equipment constructed from conventional materials.

After the reaction of amine with hexachlorobenzene is completed, the reaction product is further reacted with alkylene oxide or with lactone or both, until all of the remaining reactive amino-hydrogens have been reacted. The alkylene oxide and/or lactone addition is carried out in accordance with the procedures that are well known in the art. The alkylene oxides that are employed for this purpose are preferably those having from 2 to 4 carbon atoms such as ethylene oxide, propylene oxide, and butylene oxide. Among the lactones that can be employed are gamma-valero-lactone, epsilon-caprolactone, methyl-epsilon-caprolactone, zeta-enantholactone, and other lactones that have from 5 to 8 carbon atoms in the lactone ring and preferably having a total of no more than 18 carbon atoms. No catalyst need be employed for the alkylene oxide addition. The lactone addition may proceed more readily if a small amount of a catalyst such as tetraisopropyl titanate or stannous octoate is employed.

Within the broad class of compositions that are within the scope of the invention, there are several desirable subgeneric classes. For instance, one desirable class of compositions can be represented by Formula III:

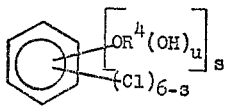

III

Wherein $s$ represents a number having an average value of from 1 to 2, wherein $R^4$ represents the residue after removal of the hydroxyl groups of an alkylene oxide adduct of a polyhydroxyalkane having $u+1$ hydroxyl groups, and wherein $u$ represents a number having a value of from 2 to 5. The compositions that are represented by Formula III are derived from hexachlorobenzene and alkylene oxide adducts of polyhydroxyalkanes that have from 3 to 6 hydroxyl groups such as glycerol, pentaerythritol, sorbitol, and the like.

Another desirable class of compositions are those that are represented by Formula IV:

IV

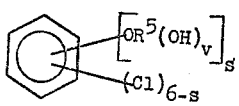

wherein $s$ represents a number having a value of from 1 to 2, wherein $R^5$ represents the residue after removal of the hydroxyl groups of an alkylene oxide adduct of a non-reducing sugar or a non-reducing sugar derivative such as alpha-methylglucoside, a glycol glucoside, sucrose, and the like, and wherein $v$ represents a number having a value in the range of from 3 to 7.

An additional useful class of compositions are those that are represented by Formula V:

V

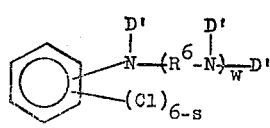

wherein D′ represents hydroxyalkyl (preferably of from 2 to 4 carbon atoms), wherein $R^6$ represents alkylene of from 2 to 6 carbon atoms, wherein $w$ represents a number having a value in the range of from 1 to 5, and wherein $s$ represents a number having an average value in the range of from 1 to 2. The compositions that are within the scope of Formula V are produced by adding alkylene oxide to the condensation products of hexachlorobenzene and alkylenediamines or polyalkylenepolyamines such as ethylenediamine, 1,3-diaminopropane, 1,2-diaminopropane, 1,3-diaminobutane, 1,5-diaminopentane, 1,6-diaminohexane, diethylenetriamine, bis(3-aminopropyl)amine, triethylenetetramine, tetraethylenepentamine, pentaethylenehexamine, and the like.

The chlorinated, hydroxyl-containing compositions of the invention are widely useful materials. For instance, they can be employed as hardeners for epoxy resins, as plasticizers, and in the production of many types of polymers.

In a third major aspect, the invention relates to urethane polymers that are produced by reacting the chlorinated, hydroxyl-containing compositions of the invention with organic polyisocyanates. Many organic polyisocyanates can be employed for this purpose, including 2,4-tolylene diisocyanate, crude tolylene diisocyanate, bis(4-isocyanatophenyl)methane, polyphenylmethylene polyisocyanates that are produced by phosgenation of aniline-formaldehyde condensation products, dianisidine diisocyanate, bitolylene diisocyanate, xylylene diisocyanate, napthalene diisocyanate, hexamethylene diisocyanate, bis(2-isocyanatoethyl) fumarate, bis(2-isocyanatoethyl) carbonate, and many other organic polyisocyanates that are known in the art, such as those that are disclosed in an article by Siefken, Ann., 562, 75 (1949). In general, the aromatic polyisocyanates are preferred because of their greater reactivity.

In producing the urethane polymers of the invention, one or more polyols in addition to the hydroxyl-containing compositions of the invention can be employed in the reaction with the organic polyisocyanate. Such additional polyols that can be employed are exemplified by the following classes of compositions:

(a) Polyoxyalkylene polyols including alkylene oxide adducts of, for example, water, ethylene glycol, diethylene glycol, propylene glycol, dipropylene glycol, glycerol, 1,2,6-hexanetriol, 1,1,1-trimethylolethane, 1,1,1-trimethylolpropane, pentaerythritol, sorbitol, sucrose, lactose, alpha-methylglucoside, alpha-hydroxyalkylglucoside, ammonia, triethanolamine, triisopropanolamine, ethylenediamine, diethylenetriamine, Novolac resins, phosphoric acid, benzenephosphonic acid, polyphosphoric acids such as tripolyphosphoric acid and tetrapolyphosphoric acids, phenol-aniline-formaldehyde ternary condensation products, aniline-formaldehyde condensation products, and the like, are useful. The alkylene oxides employed in producing polyoxyalkylene polyols normally have from 2 to 4 carbon atoms. Propylene oxide and mixtures of propylene oxide with ethylene oxide are preferred.

(b) Polyesters of polyhydric alcohols and polycarboxylic acid such as those prepared from an excess of ethylene glycol, propylene glycol, 1,1,1-trimethylolpropane, glycerol, or the like reacted with phthalic acid, adipic acid, and the like, are useful polyols.

(c) Lactone-based polyols prepared by reacting either a lactone such as epsilon-caprolactone and gamma-valerolactone or a mixture of a lactone and an alkylene oxide with a polyfunctional initiator such as a polyhydric alcohol, an amine, or an aminoalcohol, are also useful.

(d) Phosphorus-containing derivatives such as tris(dipropylene glycol)phosphite, O,O′-diethyl N,N-bis(2-hydroxyethyl)-aminomethylphosphonate, and the like are useful in urethane foams.

The foregoing are merely illustrative of the many polyols that can be employed in conjunction with the hydroxyl-containing compositions of the invention.

The polyol or polyol mixture employed can have hydroxyl numbers which vary over a wide range. In general, the hydroxyl numbers of the polyols employed in the invention can range from about 20, and lower, to about 800, and higher, preferably, from about 30 to about 700 and more preferably, from about 45 to about 600. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{m.w.}$$

where

OH = hydroxyl number of the polyol
$f$ = average functionality, that is average number of hydroxyl groups per molecule of polyol
m.w. = average molecular weight of the polyol The exact polyol employed depends upon the end-use of the urethane product. For example, when used to prepare foams, the molecular weight and the hydroxyl number are selected properly to result in flexible, semi-flexible, or rigid foams. The polyol preferably possesses a hydroxyl number of from about 200 to about 700 when employed in rigid foam formulations, from about 70 to about 250 for semi-flexible foams, and from about 45 to about 70 or more when employed in flexible foam formulations. Such limits are not intended to be restrictive, but are merely illustrative of the large number of possible combinations of the polyols that can be employed.

The urethane polymers of the invention can take the form of foamed products, elastomers, surface coatings, castings, and the like. The foamed products can be produced by the one-shot technique wherein all of the reactants are reacted simultaneously with the foaming operation, by the prepolymer technique, or by the quasi-prepolymer technique, all of which are well known in the art. In producing elastomers and castings, the prepolymer technique is useful. In the prepolymer technique, the isocyanate is reacted with a slightly less than stoichiometric quantity of polyol to produce a prepolymer having a low percentage (e.g., from 4 to 10 percent) of free —NCO groups. The prepolymer is subsequently converted into an elastomer by reacting with a cross-linking agent having reactive hydrogen atoms such as a diamine, for instance, a bis(aminochlorophenyl)methane. The amine-containing polyols of the invention may be too reactive to be employed in a prepolymer technique, except possibly with aliphatic isocyanates. In producing surface coatings, there are several types of known reaction techniques which can be employed.

The amount of polyisocyantae employed will vary slightly depending upon the nature of the polyurethane being prepared. In general the total —NCO equivalent to total active hydrogen equivalent (i.e., hydroxyl plus water, if water is present) should be such as to provide a ratio of about 1.0 to 1.2 equivalents of —NCO per equivalent of active hydrogen, and preferably a ratio of about 1.05 to 1.1 equivalents of —NCO per reactive hydrogen.

When foams are being produced, foaming can be accomplished by employing a small amount of water in the reaction mixture (for example, from about 0.5 to 5 weight percent of water, based on total weight of the reaction mixture), or through the use of blowing agents which are vaporized by the exotherm of the isocyanate-reactive hydrogen reaction, or by a combination of the two methods. All of these methods are known in the art. The preferred blowing agents are water and certain halogen-substituted aliphatic hydrocarbons which have boiling points between about —40° C. and 70° C., and which vaporize at or below the temperature of the foaming mass. Illustrative are, for example, trichlorofluoromethane, dichlorodifluoromethane, dichloromonofluoromethane, dichloromethane, bromotrifluoromethane, chlorodifluoromethane, chloromethane, 1,1 - dichloro - 1 - fluoroethane, 1,1-difluoro - 1,2,2 - trichloroethane, chloropentafluoroethane, 1-chloro - 2 - fluoroethane, 1,1,2 - trichloro-1,2,2-trifluoroethane, and the like. Other useful blowing agents include low-boiling hydrocarbons such as butane, pentane, hexane, and the like. Many other compounds easily volatilized by the exotherm of the isocyanate-reactive hydrogen reaction also can be employed. A further class of blowing agents includes thermally-unstable compounds which liberate gases upon heating, such as N,N'-dimethyl-dinitrosoterephthalamide.

The amount of blowing agent used will vary with the density desired in the foamed product. In general it may be stated that for 100 grams of reaction mixture containing an average isocyanate/reactive hydrogen ratio of about 1:1, about 0.005 to 0.3 mole of gas are used to provide densities ranging from 30 pounds to 1 pound per cubic foot respectively.

Catalysts can be employed in the reaction mixture for accelerating the isocyanate-reactive hydrogen reaction. Such catalysts include a wide variety of compounds. Among the most useful catalysts are the tertiary amines and the organic tin compounds. Specific illustrative tertiary amines include N-methylmorpholine, N,N,N',N',- tetramethyl - 1,3-butanediamine, 1,4-diazabicyclo-[2.2.2] octane, bis [2-(N,N-dimethylamino)ethyl]ether, and the like. Useful organic tin compounds include stannous octoate, stannous acetate, stannous oleate, dibutyltin diacetate, dibutyltin dilaurate, and the like. Many combinations of catalysts can be employed, for instance, it is useful to employ one or two tertiary amines in combination with stannous octoate (in making flexible foams) or dibutyltin dilaurate (in making rigid foams). The catalyst is employed in catalytic amounts such as from about 0.05 weight percent to about 6 weight percent, based on weight of polyol.

When producing urethane foams, it is useful in most cases to employ a surfactant which serves as a stabilizer in making flexible foams and as a cell size regulator in making rigid foams. Polysiloxane-polyoxyalkylene block copolymers are useful surfactants for this purpose. Among the polysiloxane-polyoxyalkylene block copolymers that are useful are those that are disclosed in U.S. Patents 2,834,748 and 2,917,480 (Bailey et al.) and 2,846,458 (Haluska). The surfactant is normally employed in amounts of from about 0.01 to about 2 weight percent, based on weight of polyol.

An excellent summary of urethane polymer chemistry and technology is found in the text by Saunders and Frisch, "Polyurethanes:Chemistry and Technology," Interscience Publishers, New York. Part I, "Chemistry," was published in 1963 and Part II, "Technology," in 1964.

The urethane polymers of the invention have wide utility. For instance, they can be employed as elastomers, rigid and flexible foams, coatings, and the like. The wide utility as gaskets, sealers, in insulation, cushions and padding, in paints, and the like, of such urethane polymers is well known.

The examples which follow illustrate the invention.

In the examples, various materials were employed in the preparation of the hydroxyl-containing compositions of the invention and the urethane foams therefrom. The identification of those materials not fully identified in the examples is as follows:

Polyol A—Propylene oxide adduct of pentaerythritol having a hydroxyl number of 564.
Polyol B—Propylene oxide adduct of sorbitol having a hydroxyl number of about 490.
Polyol C—Propylene oxide adduct of alpha-methylglucoside having a hydroxyl number of 486.
Polyol D—Propylene oxide adduct of sucrose having a hydroxyl number of 458.
Polyol E—Adduct of 3 moles of propylene oxide to one mole of glycerol.
Isocyanate A—Produced by phosgenation of the condensation product of aniline and formaldehyde. Isocyanate A has an isocyanate equivalent weight of about 134 and an average molecular weight of about 390. Isocyanate A' contained 1.5 weight percent of Surfactant A, a silicone of the formula

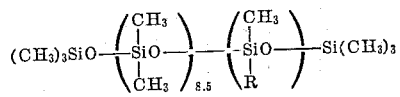

wherein R is a group of the formula

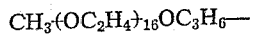

Prepolymer A—Produced by reacting an excess of tolylene diisocyanate with the reaction product of propylene oxide and tetrapolyphosphoric acid having a hydroxyl number of about 350. The prepolymer had a free NCO content of about 23 percent.
Polyol F—Propylene oxide adduct of diethylenetriamine having a hydroxyl number of 700.
TMBDA—N,N,N',N'-tetramethyl-1,3-butanediamine
D-22—Dibutyltin Dilaurate
DABCO—1,4-Diazabicyclo[2.2.2]octane Phosphonate A—O,O'-diethyl N,N-bis(2-hydroxyethyl) aminomethyl-phosphonate Polyol G—An 80/20 propylene oxide/ethylene oxide adduct of a phenol/aniline/formaldehyde ternary condensation product having a hydroxyl number of about 320.

Example 1

To a 3-liter, 4-necked flask equipped with a stirrer, thermometer and a stripping-type still head was charged a mixture of 737 grams of Polyol A, 422 grams of hexachlorobenzene, and 59.5 grams of sodium hydroxide (pelleted form). Under a reduced pressure of 180 mm., the kettle temperature was raised rapidly to 125–145° C. and held there for a period of four hours during which time some 24 grams of water were removed overhead. The reaction mixture was then filtered through a steam-heated Büchner funnel to remove by-product sodium chloride along with any unreacted hexachlorobenzene. The solid thus removed weighed 112 grams after drying and was found by water extraction to consist of 84 grams of sodium chloride and 28 grams of unreacted hexachlorobenzene. The filtrate was diluted with 91 percent aqueous isopropanol and neutralized by passage through a double-stage ion exchange column employing Amberlite IR 120H and IRA 425 as the exchange resins. Stripping of the column effluent to a maximum temperature of 140° C. at full pump vacuum left 921 grams of an amber-colored residue product having an hydroxyl number of 328, an average molecular weight of 522, a chlorine content of 21.0 percent and a viscosity of 19,250 cps. at 25° C.

Example 2

To a 3-liter, 4-necked glass kettle equipped with a stirrer, thermometer and reflux condenser was charged a mixture of 200 ml. diethyl carbitol, 359 grams of hexachlorobenzene and 880 grams of an alkoxide solution prepared by treating 1276 grams of Polyol B with 29 grams of metallic sodium. At atmospheric pressure the mixture was heated for two hours at 130–140° C. and then for an additional eighteen hours at 150° C. Filtration, drying and water extraction of the solid recovered, in the manner described in Example 1, served to demonstrate that 67 grams of sodium chloride and 52 grams of unreacted hexachlorobenzene were removed by the filtration. Ion-exchange treatment of the filtrate (971 grams) after the manner described in Example 1 followed by vacuum-stripping to remove solvent left a dark brown residue product polyol which had an hydroxyl number of 280, an average molecular weight of 665, a chlorine content of 17.0 percent and a viscosity of 12,600 cps. at 25° C.

Example 3

In a manner similar to that of Example 2, 697 grams of an alkoxide solution prepared by reacting 675 grams of Polyol B with 14 grams of sodium metal was reacted with 174 grams of hexachlorobenzene, in the absence of added diluent, for two hours at 130–140° C. and for an additional 16 hours at 160–180° C. At the end of the reaction period the charge was cooled to about 80° C., diluted with isopropanol and filtered to removed sodium chloride and unreacted hexachlorobenzene. The weight of solid thus recovered was 55 grams, of which 36 grams represented sodium chloride and the other 19 grams unreacted hexachlorobenzene. The yield of stripped residue product was 913 grams. Ion-exchanging of an aqueous isopropanol solution of this material left the residue product polyol as a dark brown liquid having an hydroxyl number of 376, an average molecular weight of 590, a chlorine content of 9.07 percent and a viscosity of 55,000 cps. at 25° C.

Example 4

To a 2-liter, 4-necked glass kettle equipped with a stirrer, condenser and thermometer was charged a mixture of 1152 grams (11.14 moles) of diethylenetriamine and 570 grams (2.0 moles) of hexachlorobenzene. The temperature of the mixture was raised to 120–125° C. and held there for 1.5 hours, after which the contents were cooled to 40° C. and poured into 2.5 liters of a mixture of ice and water containing 2.0 moles of potassium hydroxide to neutralize the acid produced in the condensation. Separation of the organic layer, followed by washing, drying and stripping at 135° C./1 mm. left the crude N-(pentachlorophenyl)diethylenetriamine as a light brown mobile liquid having a molecular weight of 375, as opposed to 352 for the theoretical structure. This material was then treated at 90–100° C. with propylene oxide in an amount sufficient to "cover" all the reactive N—H groups on the starter. For 210 grams of starter, 98 grams of propylene oxide was thus required. Thorough stripping of the oxypropylated product left the residue product polyol as a light brown, viscous liquid having an hydroxyl number of 318, an average molecular weight of 543, a chlorine content of 33.8 percent and a viscosity in excess of 2,000,000 cps. at a temperature of 25° C.

Example 5

In a manner identical to that described in Example 1, 736 grams of Polyol C, 51 grams of sodium hydroxide and 363 grams of hexachlorobenzene were heated at 130–140° C. under 180 mm. pressure for a total of six hours, all water of reaction being removed as formed throughout. Dilution of the product with isopropanol followed by filtration under reduced pressure served to remove 133 grams of dried solids, 69 grams of which was indicated by its water solubility to be sodium chloride and the remainder by its insolubility to be unreacted hexachlorobenzene. Double ion-exchanging of the filtrate as described in earlier examples afforded the residue product polyol (860 grams) as a dark brown liquid having an hydroxyl number of 289, an average molecular weight of 589, a chlorine content of 20.5 percent and a viscosity of 985,000 cps. at a temperature of 25° C.

Example 6

In a manner identical to that described above, crude pentachlorophenyl-diethylenetriamine was prepared by reacting diethylenetriamine with hexachlorobenzene. This product was charged to a 2-liter, 4-necked flask equipped with stirrer, thermometer, acetone-Dry Ice cooled condenser and feed tank. At a temperature of 100–115° C., a total of 204 grams of propylene oxide was added dropwise and allowed to cook-out to complete reaction. To this product was then added dropwise 200 grams of ε-caprolactone at a temperature of 100° C., with a subsequent cook-out at 130° C. The residue product thus obtained was subsequently treated at 95–100° C. with sufficient propylene oxide to "cover" all the remaining N—H functionality and to afford the residue product polyester-polyamide type polyol as a brown, viscous liquid having a hydroxyl number of 284, a chlorine content of 35.0 percent and a viscosity exceeding 2,000,000 cps. at 25° C.

Example 7

In a manner similar to that of Example 2, 1387 grams of an alkoxide solution prepared from 35 grams of sodium and 1354 grams of Polyol D, was reacted with 435 grams of hexachlorobenzene in the presence of 600 cc. of diethyl carbitol. The charge was heated for a total of 6 hours at a temperature of 130–140° C., after which it was filtered under reduced pressure. The dried solid weighed 261 grams of which 71 grams was sodium chloride and the remaining 190 was unreacted hexachlorobenzene. Work-up of the filtrate as described in previous examples afforded the residue product polyol as a brown liquid having an hydroxyl number of 293, an average molecular weight of 950, a chlorine content of 12.3 percent and a viscosity of 420,000 cps. at 25° C.

Example 8

In a manner similar to that of Example 2, 551 grams of an alkoxide solution prepared from 532 grams of Polyol E and 23 grams of sodium was reacted with 285 grams of hexachlorobenzene by heating for a total of 16 hours at 130–155° C. The mixture was diluted with isopropanol and filtered to remove 141 grams of solid, of which 53 grams was shown to be sodium chloride and the remainder unreacted hexachlorobenzene. Ion-exchanging and stripping of the filtrate afforded 639 grams of residue product polyol as a dark brown, mobile liquid having an hydroxyl number of 390, an average molecular weight of 415, a chlorine content of 16.6 percent and a viscosity of 3,620 cps. at 25° C.

Example 9

In a manner like that of Example 4, crude pentachlorophenyl-triethylenetetramine was prepared by the condensation of 1315 g. (9.0 moles) of triethylenetetramine with 855 grams (3.0 moles) of hexachlorobenzene. The crude polyamine thus obtained weighed 1020 grams and had an alkalinity equivalent weight of 158.3, as opposed to a theoretical value of 131.7 for a 1:1 condensation product. At 90–100° C., propylene oxide was added to 612 grams of this polyamine until a steady reflux of oxide indicated that all the N—H reactive functions had been "covered" with oxide. The total amount of propylene oxide thus consumed was 304 grams. The residue product polyol thus obtained had an hydroxyl number of 329, an average molecular weight of 697, a chlorine content of 29.8 percent and a viscosity in excess of 2,000,000 cps. at 25° C.

Foam formulations and evaluation

The polyols described above were evaluated for utility as flame retardants for rigid foam by employing them either alone or in combination with other polyols. All foams were prepared by the "one-shot" technique and employed either Isocyanate A or Prepolymer A as the activator component. In all cases, the activator was utilized in 5 percent excess. In general, the formulations were designed to produce foam having densities within the range of 1.8–2.2 pounds per cubic foot. All foams were oven-cured at 70° C. for 10 minutes and aged for a minimum of three days prior to testing.

The testing procedures used for foam evaluation are all currently accepted procedures. Core density was tested by ASTM D-1622, apparent closed cell content by ASTM D-1940-62, compressive strength perpendicular and parallel to rise by ASTM C273, durability under conditions of cold aging, dry aging and humid aging respectively, by ASTM D-2126B, 2126E and 2126F, and flammability by ASTM D-1692.

In the following section are given some of the typical foam formulations used in the evaluation of the polyols of this invention. In each case the pertinent foam evaluation data on the polyol in question and on the corresponding control foam are summarized below the formulation. Parts are by weight, unless otherwise indicated. The fluorocarbon employed was trichlorofluoromethane.

EXAMPLE 10

| Inventive Polyol Formulation | | Control Formulation | |
|---|---|---|---|
| Component | Parts | Component | Parts |
| Overall Hydroxyl Number of 540: | | Hydroxyl number 564: | |
| Example 1 | 78 | Polyol A | 100 |
| Glycerol | 11.4 | Fluorocarbon | 32 |
| Polyol F | 10.6 | D-22 | 0.5 |
| Fluorocarbon | 36 | TMBDA | 0.3 |
| D-22 | 0.2 | Isocyanate A′ | 143 |
| Isocyanate A′ | 137 | | |

The inventive polyol formulation above produced foam which was self-extinguishing (SE) by the ASTM D-1692 flammability test (burning extent=2.5 in.); the control foam, in contrast, was not self-extinguishing, but rather burned at the rate of 5.2 inches/minute. In all other properties tested, the two foams were quite comparable.

EXAMPLE 11

| Inventive Polyol Formulation | | Control Foam Formulation | |
|---|---|---|---|
| Component | Parts | Component | Parts |
| Hydroxyl number 328: | | Hydroxyl number 564: | |
| Example 1 | 78 | Polyol A | 100 |
| Fluorocarbon | 36 | Fluorocarbon | 32 |
| Surfactant A | 1.5 | Surfactant A | 1.5 |
| D-22 | 0.5 | D-22 | 0.5 |
| TMBDA | 0.3 | TMBDA | 0.3 |
| Prepolymer A | 117 | Prepolymer A | 201 |

Both of the above foams were self-extinguishing (SE) by ASTM D-1692. However, the control foam burned 2.7 inches, therefore failing the UL-94 test (2.25 inches maximum), whereas the inventive polyol foam burned only 1.9 inches, therefore passing the UL-94 test. Furthermore, the inventive polyol-containing foam was superior to the control foam in humid aging volume change after 1, 2, and 4 weeks, respectively.

EXAMPLE 12

| Control Polyol Formulation | | Inventive Polyol Formulation | |
|---|---|---|---|
| Component | Parts | Component | Parts |
| Hydroxyl number 499: | | Hydroxyl number 280: | |
| Polyol B | 100 | Example 2 | 100 |
| Fluorocarbon | 40 | Fluorocarbon | 44 |
| DABCO | 2.4 | D-22 | 0.66 |
| TMBDA | 0.8 | TMBDA | 0.3 |
| Isocyanate A′ | 124 | Isocyanate A′ | 70.8 |

The control foam above failed the ASTM D-1692 flammability test, showing a burning rate of 8.4 inches/minute. The inventive polyol-containing foam was SE, however, showing a burning extent of 2.8 inches.

EXAMPLE 13

| Inventive Polyol Formulation | | Control Foam Formulation | |
|---|---|---|---|
| Component | Parts | Component | Parts |
| Polyol G | 45 | Polyol G | 85 |
| Example 4 | 55 | Phosphonate A | 15 |
| Surfactant A | 1.5 | Surfactant A | 1.5 |
| Fluorocarbon | 32 | Fluorocarbon | 32 |
| D-22 | 0.1 | D-22 | 0.8 |
| Isocyanate A | 80.7 | Isocyanate A | 86 |

At similar overall hydroxyl numbers and foam densities, the two foams from the above formulations were both SE, with burning extents of only 1.0 inch each. The inventive polyol containing-foam, however, was superior to the control foam in both humid aging volume change and in compressive strength after humid aging.

EXAMPLE 14

| Inventive Polyol Formulation | | Control Polyol Formulation | |
|---|---|---|---|
| Component | Parts | Component | Parts |
| Overall hydroxyl number 540: | | Hydroxyl number 540: | |
| Example 3 | 79.45 | Polyol B | 88 |
| Polyol F | 11.75 | Polyol F | 12 |
| Glycerol | 8.76 | 1,2,6-Hexanetriol | 2.5 |
| Fluorocarbon | 44 | DABCO | 1.2 |
| D-22 | 0.2 | TMBDA | 0.35 |
| Prepolymer A | 184.5 | Prepolymer A | 183.5 |

Both of the above polyols produce foams which rate as self-extinguishing by ASTM D-1692. The control foam burns 3.2 inches, however, and therefore fails the UL-94 flammability specifications. The inventive polyol-containing formulation, on the other hand, passes the UL-94 specification on the basis of a burning extent of 2.0 inches. Furthermore, the inventive foam formulation shows only about ½ the volume change on humid aging as that exhibited by the control foam.

What is claimed is:

1. A composition of the formula:

(a) 

wherein R represents the residue after removal of the hydroxyl groups of an alkylene oxide adduct of sorbitol, pentaerythritol, sucrose, alpha-methylglucoside, or a glycol glucoside, said alkylene oxide adduct having $r+1$ alcoholic hydroxyl groups, wherein $r$ represents a number having a value of from 3 to 7, and wherein $s$ represents a number having an average value in the range of from 1 to 2, or (b) 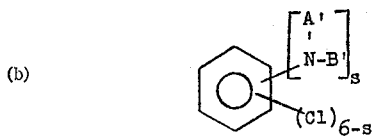

wherein $s$ represents a number having an average value in the range of from 1 to 2, wherein A' represents hydrogen or $$-\!\!\left(\!R^1O\!\right)_{\!n}\!H$$

wherein $n$ represents a number having a value of at least 1 and wherein $R^1$ represents alkylene of from 2 to 4 carbon atoms, and wherein B' represents (1) $-\!\!\left(\!R^1O\!\right)_{\!n}\!H$ wherein $R^1$ and $n$ have the significance stated above, (2) omega-hydroxyalkylcarbonyl (3) 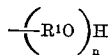

wherein $R^2$ represents a divalent group having up to 20 carbon atoms and being selected from the class consisting of alkylene, alkyleneoxyalkylene, bis(alkyleneoxycarbonyl)alkenylene, bis(alkylenecarbonyl)alkylene, cycloalkylene, bis(alkyleneoxy)carbonyl, alkylenearylenealkylene, alkylenecycloalkylenealkylene, bis(cycloalkylene)alkylene, and bis(alkyleneoxy)alkylene, wherein the variable A' has the significance stated above, and wherein C' represents omega-hydroxyalkylcarbonyl or $\text{\textendash}(R^1O)_n H$ wherein $R^1$ and $n$ have the significance stated above, or (4) 

wherein $R^3$ represents alkylene of from 2 to 6 carbon atoms, wherein $t$ represents a number having a value of from 1 to 3, and wherein the variables A' and C' have the significance stated above.

2. A composition of the formula:

wherein D' represents hydroxyalkyl of from 2 to 4 carbon atoms, wherein $R^6$ represents alkylene of from 2 to 6 carbon atoms, wherein $w$ represents a number having a value in the range of from 1 to 5, and wherein $s$ represents a number having an average value of from 1 to 2.

3. The composition of claim 2 wherein the variable $R^6$ is ethylene.

4. The composition of claim 1 wherein the alkylene oxide adduct of sub-paragraph (a) is an alkylene oxide adduct of sorbitol.

5. The composition of claim 1 wherein the alkylene oxide adduct of sub-paragraph (a) is an alkylene oxide adduct of pentaerythritol.

6. The composition of claim 1 wherein the alkylene oxide adduct of sub-paragraph (a) is an alkylene oxide adduct of sucrose.

7. The composition of claim 1 wherein the alkylene oxide adduct of sub-paragraph (a) is an alkylene oxide adduct of alpha-methylglucoside.

References Cited

UNITED STATES PATENTS 2,913,499  11/1959  Dazzi _____ 260—613
3,123,580  3/1964  Dunn et al. _____ 260—613

ELBERT L. ROBERTS, *Primary Examiner.*

LEWIS GOTTS, *Examiner.*

J. R. BROWN, *Assistant Examiner.*